UNITED STATES PATENT OFFICE.

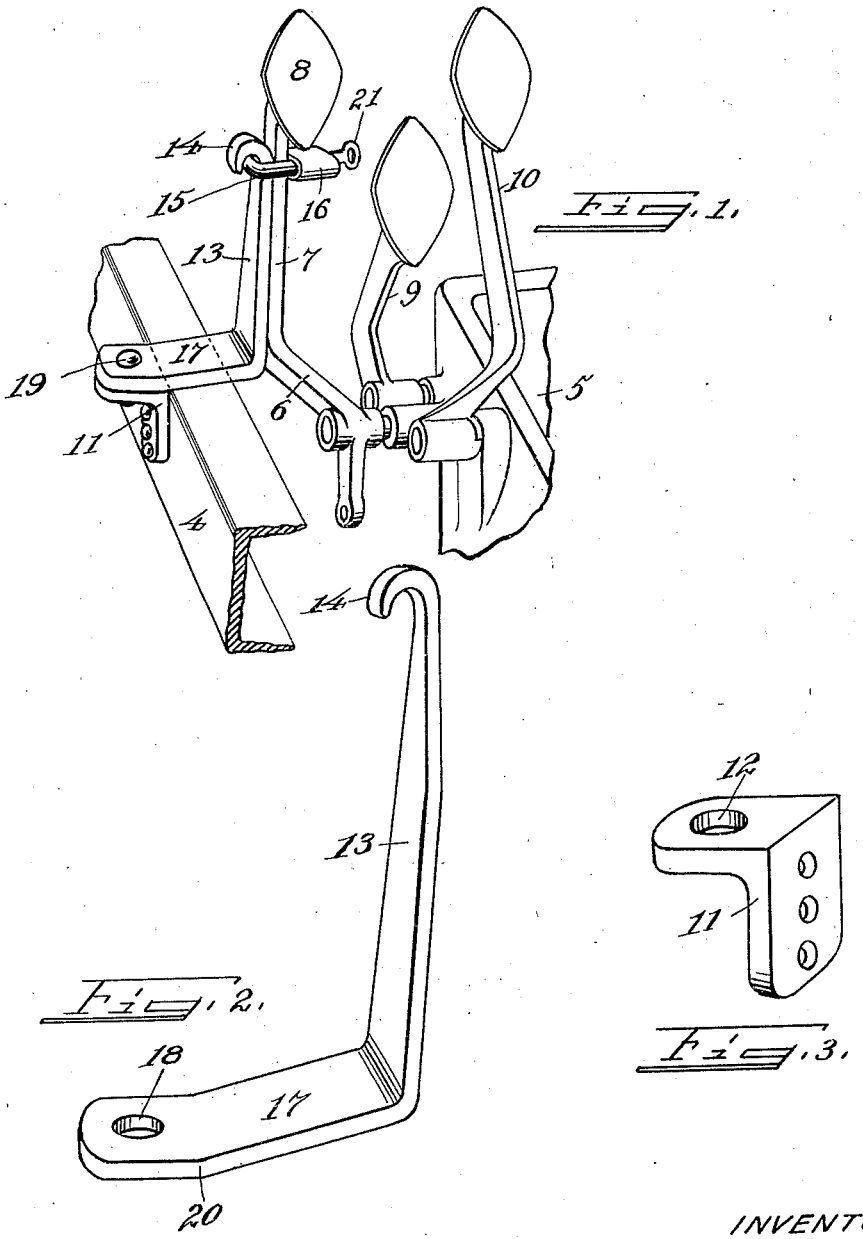

JAMES RALPH HUNTER, OF CINCINNATI, OHIO.

AUTOMOBILE LOCK.

1,408,806.  Specification of Letters Patent.  Patented Mar. 7, 1922.

Application filed March 22, 1920. Serial No. 367,823.

*To all whom it may concern:*

Be it known that I, JAMES RALPH HUNTER, a citizen of the United States, and a resident of Cincinnati, in the county of Hamilton and State of Ohio, have invented a certain new and useful Improvement in Automobile Locks, of which the following is a specification.

This invention relates to safe-guard devices for use in temporarily locking the upwardly-extending clutch-pedal of the motor-vehicle or automobile popularly known as the "Ford" type of machine, but which may be adapted, if desired, without material changes, expense, or inconvenience, to other makes of automobiles; and it consists mainly of an upright arm or shank having a lateral hook-formation at its upper or outer end and a lateral resting and fastening base or foot-formation at its lower end, the said foot-formation having an eye or opening made therein for the engagement of a bolt or rivet that, in turn, further engages one of the longitudinal channel-irons or reaches of the supporting-frame of the machine, beneath the slotted foot-board thereof, and arranged convenient to the driver or attendant who uses or applies a padlock to the said upright arm and the adjacent upwardly-extending clutch-pedal for connecting or coupling them together in a firmly-locked manner and thereby preventing any unauthorized working-movement of said clutch-pedal and its use in starting and otherwise running the motor-vehicle.

In the accompanying sheet of drawings,—

Figure 1 is a perspective view showing a fragmentary part of the under reaches or channel-irons of the supporting frame of a motor-vehicle of the special type mentioned, and including the operating-pedals of the machine together with my improved clutch-pedal detent or lock device that is in full locking-position for preventing any working-movement of the said clutch-pedal as well as the consequent unauthorized running of the machine; Fig. 2, a perspective view of my preferred form of lock-arm taken by itself and without the padlock coupling or clutch-pedal fastening-connection; and Fig. 3, a detail perspective view of the supporting-bracket ordinarily used on the under channel-iron of the machine frame and adapted to the ready attachment of my improved lock-arm clutch-pedal detent.

4 indicates the left-hand (looking toward the front) under channel-iron of a "Ford" motor-vehicle, and 5 the right-hand part of the under supporting-frame that is located beneath the ordinary slotted foot-board, the latter not being necessary to show herein.

6 indicates the ordinary bent clutch arm or foot-pedal having its customary upwardly-extending shank-portion 7 that is surmounted by the foot-rest 8.

The reverse-pedal 9 and the brake-pedal 10 are as customary, but do not take any part in the formation or action of the invention herein.

11 indicates a right-angled bracket-arm riveted to the channel-iron 4 and having an opening 12 in its lateral portion.

13 indicates an upright arm or shank that forms the essential feature of my invention herein. This arm 13 is preferably tapered part of its length, with its narrowest part at its top that is formed into a lateral hook-end 14, the hook being turned downwardly, claw fashion, as well shown in both Figs. 1 and 2.

The main part of the said arm or shank 13 is made straight and broad enough for strength and to prevent twisting or any lateral bending or breakage, as well as to prevent the dropping or sliding downwardly of the shackle-link 15 of a padlock 16 that engages the upper end of the arm 13 just beneath or within the hook-formation 14 and spans or embraces the adjacent clutch-arm shank 7 for locking the said clutch-arm against unauthorized movement and the running of the vehicle by a thief or other person not authorized.

The lower end of the arm 13 is bent outwardly at a right-angle thereto to form a base or foot-rest 17, and an elongated opening 18 is made near its outer end for the reception of the vertical bolt or rivet 19 (a rivet preferably, to prevent unauthorized detachment) that fastens the lock device in firm and rigid position to the bracket-arm 11 and further resting flatly and firmly on the upper face of the channel-iron 4. Instead of the round hole 12 a square or angular one may ordinarily be substituted in the upper lateral part of the bracket-arm 11 to accommodate an ordinary square-shanked bolt or rivet to provide against the lock-arm 13 being swung or turned away from a firm normal position on the channel-iron 4.

It will be seen in Fig. 2 that the base or foot-rest 17 of the lock-arm 13 deflects at 20 from a straight line. This deflection is made so as to allow for the proper alinement of the upright lock-arm 13 with the upright shank-portion 7 of the clutch-pedal in said special type of vehicle wherein the clutch and other pedals are not in direct transverse alinement with the bracket-arm 11 that is ordinarily used in fastening parts to the channel-arm 4 and not an added part for my special lock device herein. The lock-arm 13 is set in position so that the clutch-arm just clears or misses it when the padlock has been removed and the vehicle is to be used. Thus no interference occurs.

A key 21 is shown in the padlock which may be readily used when occasion requires.

The hook or claw 14 in use prevents any upward disengagement of the padlock and forms an important feature of my invention.

I claim:—

A lock device for a motor-vehicle comprising an upright tapered lock-arm having a lateral, downwardly-turned claw or hook-formation at its upper end and a lateral or outwardly-disposed foot-piece at its lower end, means for attaching said foot-piece on the vehicle adjacent the clutch-arm of its driving-mechanism, an upright clutch-arm or pedal-member on the vehicle, and a padlock having a shackle loop or link that is adapted to encircle or embrace the said hook-portion of the lock-arm and the upper part of the clutch-arm in locking-engagement, substantially as herein shown and described.

JAMES RALPH HUNTER.